March 1, 1927.

W. F. HUNDEMER 1,619,126

LUBRICATING DEVICE

Filed Feb. 8, 1926

INVENTOR.
W. F. HUNDEMER.
BY
ATTORNEYS.

Patented Mar. 1, 1927.

1,619,126

UNITED STATES PATENT OFFICE.

WALTER F. HUNDEMER, OF ALAMEDA, CALIFORNIA, ASSIGNOR TO GAT GUN LUBRICATING CORPORATION, OF OAKLAND, CALIFORNIA, A CORPORATION OF CALIFORNIA.

LUBRICATING DEVICE.

Application filed February 8, 1926. Serial No. 86,792.

The present invention relates to improvements in lubricating devices and has particular reference to a hand operated grease gun principally used for lubricating motor vehicles and the like. The present invention particularly proposes to introduce certain improvements in the grease gun described and claimed in the B. S. Nelson Patent, Number 1,377,023, of May 3, 1921, which latter grease gun comprises in its principal features a cylinder a plunger reciprocable therein, a pistol grip for operating the plunger and a cylindrical grease receptacle extending radially from the side of the cylinder and communicating therewith through a port. It is proposed in the present invention to provide certain improvements in the Nelson device such as will facilitate the operation of the same, as will appear from the description following hereinafter.

The preferred form of my invention is illustrated in the accompanying drawing in which.

Figure 1:
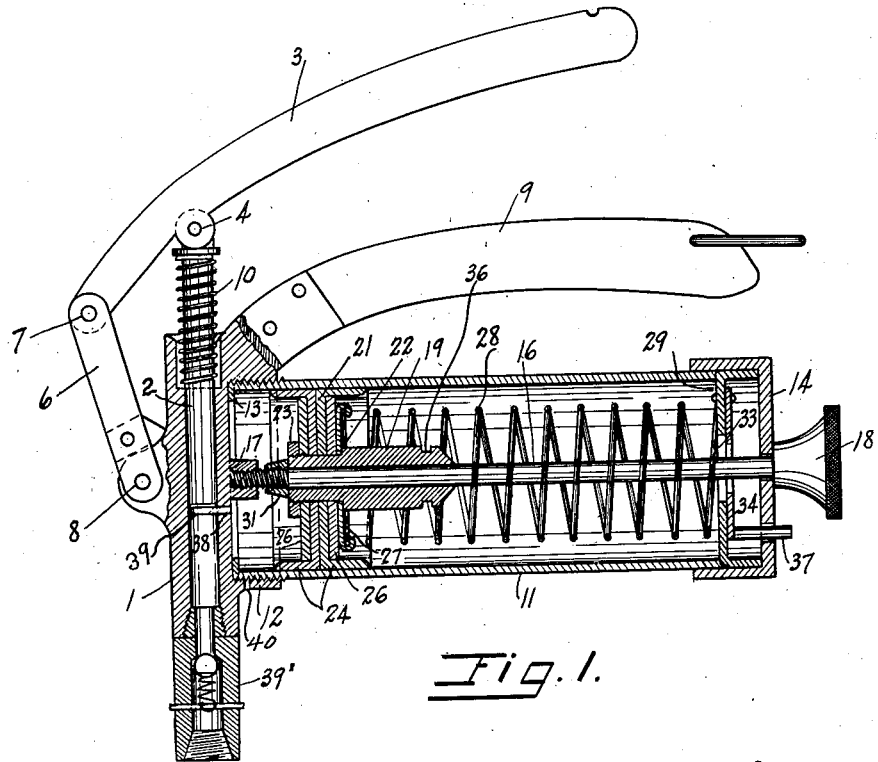
Figure 1 shows a vertical section through my lubricating device.
Figure 2:
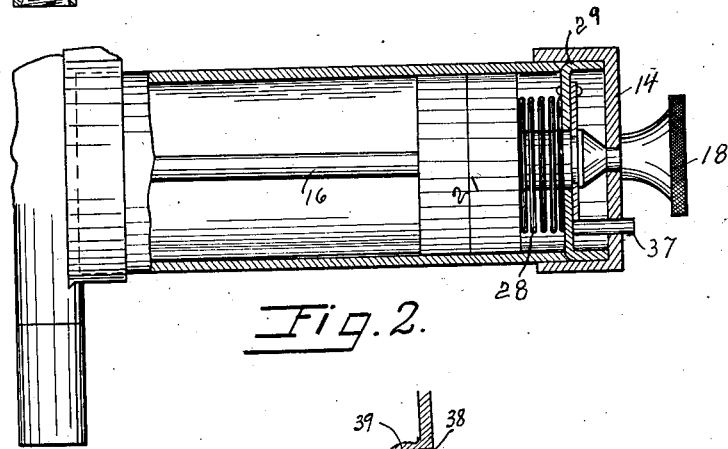
Figure 2 is a similar section with a piston shown in a different position and a portion shown in side elevation, and Figure 3 a detail view illustrating the ports between the cylinder and the lubricant receptacle.
Figure 3:
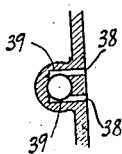

While I have shown only the preferred form of the invention I wish to have it understood that various changes or modifications may be made within the scope of the claims hereto attached without departing from the spirit of the invention.

In its preferred form my lubricating device comprises a cylinder 1 having a plunger 2 reciprocating therein and a lever 3 pivoted at the end of the plunger as at 4 and connected to a link 6 as shown at 7, which latter is pivoted to the cylinder housing as shown at 8 so that the plunger may be freely moved back and forth by operating through the lever 3. A gripping handle 9 extends from the cylinder in operative relation to the free end of the lever 3 so that the fingers of a hand may be engaged with the handle while the palm of the hand engages the lever. A spring 10 tends to force the plunger outwardly.

A lubricant receptacle or container 11 preferably cylindrical in form is adapted for insertion into a ring formed integral with the cylinder in such a manner that the container extends radially therefrom. A suitable washer 13 may be interposed between the container and the cylinder. The outer end of the container is closed by means of a cap 14 and a rod 16 extends axially through the container and is threaded at its inner end to be received in a threaded hub 17 while the head 18 rests on the cap 14. The rod is dimensioned so as to firmly bear on the cap for holding the container in place before the thread reaches the end of its travel.

A sleeve 19 is slidable on the rod 16 and has a piston 21 secured thereon between a shoulder 22 and a nut 23, the piston preferably consisting of two opposed cup washers 24, two discs 26 reinforcing the flat faces thereof and an element 27 adapted to receive one end of a spring 28 encircling the rod 16. The latter spring is secured at its other end to a transverse plate 29 supported in the container in spaced relation to the cap, the normal tendency of the spring being to force the piston away from the said plate. A nut 31 limits the inward movement of the sleeve on the rod. When the sleeve is drawn inwardly by means of the piston rod after the latter has been disengaged from the hub 17 the outer end of the sleeve passes through a perforation 33 in the plate 29 and is locked against inward motion by means of a spring latch 34 which automatically engages with a groove 36 in the sleeve. The sleeve may be freed of the latch by operating a handle 37 extending through a slot in the cap 14.

Communication between the bore of the cylinder 1 and the container 11 is established by means of two ports 38 which are offset from the center line of the cylinder and arranged to communicate in part with recesses 39 in the cylinder wall. This manner of arranging the ports serves the purpose of preventing the grease from going past the bearing for the plunger 2 on the return stroke of the plunger, the recesses scraping off any grease or lubricant that may be carried by the plunger on its return stroke and the ports guide the lubricant back into the container.

The advantages of our improvements will be readily understood from the foregoing description. The rod 16 extends through the entire container and serves the purpose of fastening the container to the cylinder 1. To remove the container the piston rod 16 is revolved until it clears the hub 17 whereupon the entire container can be readily removed. The inner end of the container may then be inserted in a body of grease and the rod 16 pulled outwardly by means of the handle 18 which causes the piston to travel outwardly to suck grease into the container. When the rod reaches the end of its travel the sleeve 19 projects through the perforation 33 of the plate 29 and is engaged by the catch 34 so as to be automatically locked. The container which is now full of grease may then be placed against the cylinder 1, the rod pushed inward until it reaches the hub 17 and the container secured in place by completing the engagement of the rod with the hub. Thereupon the sleeve 19 may be released from the latch 34 by operating the handle 37 and the spring 28 will cause a slight pressure upon the grease and will also cause the piston to follow the grease for maintaining the vacuum caused in the cylinder 1 by withdrawal of the plunger 2.

As the plunger reciprocates due to manipulation of the lever 3 a vacuum is created in the cylinder on the return stroke and grease sucked into the cylinder as soon as the plunger 2 passes the ports 38. On the downward stroke this grease is forced through the open end of the cylinder into the bearing 39' or whatever the grease gun may be attached to. Any grease that may become lodged at the outside of the plunger is scraped into the recesses 39 and returned to the reservoir during the return stroke to be drawn upon at the end of the latter stroke.

During the filling of the container 11 air pockets are apt to form in the grease and to allow the operator to release the air I provide a small opening 40 in the ring 12 next to the base thereof. This hole is normally covered by the container 11 but may be uncovered by slightly turning the container, which causes the latter to recede. When the operator notices that there is an air pocket, he merely turns the container until the hole 40 is uncovered and thereupon returns the container to its original position.

I claim:

1. A lubricating device of the character described comprising a cylinder having a plunger reciprocable therein, a pistol grip for operating the plunger, a container suspended from the cylinder and communicating with the bore thereof, a rod passing through the container having a head adapted to bear on the end of the container and being threaded at the opposite end so as to be adapted for threaded engagement with the cylinder for securing the container to the same, a piston slidable on the rod within the container and a nut on the threaded end of the rod allowing the piston to be drawn backward by means of the rod after the latter has been disengaged from the cylinder.

2. A cylindrical grease container closed at one end having means for withdrawing grease therefrom associated with the other end, an axial rod slidable in the container having a piston slidable relative thereto, spring means urging the piston forward, means associated with the piston and operable by the rod allowing the piston to be retracted to the rear end of the container and means for locking the said means in the retracted position allowing the rod to be plunged forward.

3. A device as defined in claim 2 in which the latter means comprise a sleeve slidable on the rod having the piston fixed thereto, a head on the piston engaging the sleeve when the piston is drawn outwardly and a catch within the container snapping into a groove in the sleeve when the latter is withdrawn to its most rearward position.

4. In a lubricating device of the character dtscribed, a cylinder, a plunger reciprocable therein, means for operating the plunger, a cylindrical container extending radially from the cylinder, a cap for the container, a rod having a head at one end bearing on the cap and being threaded at the other end for engagement with the cylinder for holding the container in place, a sleeve slidable on the rod having a piston fixed thereon, spring means tending to force the piston toward the cylinder, a transverse plate inside the container perforated to allow a portion of the sleeve to pass therethrough and a latch automatically engaging with said sleeve for locking the same in position against the action of the spring.

5. In a lubricating device of the character described, a grease gun and a transverse booster pump threaded to the discharge end thereof, one of the elements being provided with a small hole at the juncture adapted to be normally covered by the other element but to be cleared for venting the gun when the element latter is partly unscrewed.

In testimony whereof I affix my signature.

WALTER F. HUNDEMER.